United States Patent Office 2,987,560
Patented June 6, 1961

2,987,560
PRODUCTION OF AROMATICS AND CATALYSTS THEREFOR
Peter Desmond Holmes and John Charles Stalley, Sunbury-on-Thames, England, assignors to The British Petroleum Company Limited, London, England, a British corporation
No Drawing. Filed Nov. 4, 1957, Ser. No. 694,107
3 Claims. (Cl. 260—673.5)

This invention relates to the production of aromatics from feedstocks consisting of or containing non-aromatic hydrocarbons having at least six carbon atoms in the molecule.

The invention is particularly applicable to the production of aromatics from a variety of feedstocks consisting of or containing hydrocarbons having at least six carbon atoms in a straight chain. Thus, it may be applied, for example, to specific normal paraffins such as n-hexane and n-heptane or mixtures thereof. It may also be applied to hydrocarbon mixtures containing normal paraffins, such as primary flash distillate and the products of the well-known reforming process in which a naphtha fraction is contacted at elevated temperature and pressure and in the presence of hydrogen with a dehydrogenation catalyst to produce a gasoline fraction of increased octane number.

According to the invention, a process for the production of aromatics from feedstocks consisting of or containing non-aromatic hydrocarbons having at least six carbon atoms in the molecule, comprises contacting the feedstock at elevated temperature with a catalyst consisting of a minor proportion of platinum, deposited on or incorporated with a support consisting essentially of alumina, and at least 0.01% wt. of an alkali metal in combined form.

The amount of alkali metal preferably lies within the range 0.01 to 5% wt., a greater amount being required to give a similar activity for aromatic production if the catalyst contains halogen. In general, the content of alkali metal should not exceed 3% wt. but if the catalyst contains halogen, a greater amount of alkali metal up to 5% wt. may be necessary, since additional alkali is required to offset the increased hydrocracking and isomerising effects of the halogen. Sodium is the preferred metal.

The quantity of platinum preferably lies within the range 0.01 to 5% wt.

The process is advantageously carried out at a temperature of 400 to 600° C., preferably 400 to 550° C., and at a pressure of 0–200 lb/sq. in. gauge.

The invention also comprises a catalyst for the production of aromatics from non-aromatic hydrocarbons having at least six carbon atoms in the molecule, which consists of a minor proportion of platinum, deposited on or incorporated with a support consisting essentially of alumina, and at least 0.01% wt. of an alkali metal in combined form. The quantities of alkali metal, the relationship between alkali metal and halogen and the quantity of platinum should preferably be as described above.

The catalyst according to the invention may conveniently be produced by heating a material consisting of platinum supported on alumina, preferably at 150 to 600° C. and more particularly at 550° C., cooling, contacting the cooled material with a solution of a water-soluble compound of an alkali metal in an aqueous medium, if necessary removing excess solution, drying the impregnated solid at for example a temperature above 30° C. and below the roasting temperature, and roasting the dried material at 200 to 600° C.

Suitable water-soluble compounds include fatty acid salts and mineral acid salts. A preferred compound is sodium acetate.

The invention will now be described with reference to the following examples.

EXAMPLE 1

77 millilitres of a platinum-on-alumina catalyst in the form of pellets 1/16" in diameter and 1/16" in length and having the following composition:

| | Percent wt. |
|---|---|
| Platinum | 0.575 |
| Chlorine | 0.90 |
| Sodium | 0.004 | were roasted in air at 550° C. for 1 hour.

5 grams of sodium acetate were dissolved in 60 millilitres of distilled water and the solution added to the catalyst. After standing for 10 minutes, the solution was heated at 100° C. for 15 minutes. Excess solution was decanted and the treated material dried at 160° C. for ½ hour and thereafter roasted at 500 to 550° C. for 2 hours. The material thus obtained had a platinum content of 0.57% wt. and a sodium content of 0.84% wt. of total catalyst.

EXAMPLE 2

Commercial normal hexane was passed at atmospheric pressure over the catalyst prepared as described in Example 1, in the vapour phase in the absence of a carrier gas. By way of comparison, commercial normal hexane was also passed at atmospheric pressure in the vapour phase over the catalyst to which no alkali had been added. The reaction conditions and the results obtained are set out in the following Table 1.

*Table 1*

| | | Catalyst Conditions | | | |
|---|---|---|---|---|---|
| | Feed-stock | Run 1 No sodium added | Run 2 Sodium added | Run 3 Regenerated on Run 2 | Run 4 Regenerated on Run 3 |
| Catalyst temp. ° C | | 475 | 475 | 478 | 497 |
| Space velocity v./v./hr | | 0.24 | 0.24 | 0.24 | 0.26 |
| Liquid Recovery, wt. percent | 100 | 56.7 | 84.4 | 82.7 | 73.5 |
| Yield of Products (on feed), wt. percent: | | | | | |
| Lower hydrocarbons | | 12.5 | 2.4 | | 1.3 |
| 2-Methylpentane [1] | 6.0 | 4.4 | 4.5 | 4.6 | 4.1 |
| 3-Methylpentane [1] | 8.5 | 4.4 | 7.3 | 6.0 | 6.7 |
| n-Hexane | 65.4 | 7.1 | 44.0 | 38.7 | 27.2 |
| Methylcyclopentane | 16.1 | 1.2 | 10.8 | 14.1 | 7.2 |
| Cyclohexane | 4.0 | | | | |
| Benzene | | 16.9 | 15.4 | 19.3 | 24.9 |
| Toluene | | 4.3 | 0.3 | 0.3 | 0.3 |
| Xylenes | | 8.3 | 0.3 | | |
| C₉ Aromatics | | 2.0 | | | |

[1] Including hexenes.

Regeneration of the catalyst was carried out by passing a slow stream of air over the heated catalyst for approximately 2 hours at a rate to maintain the reaction temperature below 500° C.

The results set out in Table 1 indicate that, at the same temperature, the production of higher aromatics is materially suppressed when using the sodium-containing catalyst, and although the yield of benzene is slightly less, further quantities of benzene may be produced by recycling a normal hexane fraction to the reaction zone. Run No. 4 indicates that higher temperatures may be used when using the sodium-containing catalyst, resulting in increased production of benzene without producing the same degree of break-down as occurs at lower temperatures with the catalyst to which no sodium has been added.

Further experiments were carried out in a micro-catalytic reactor (600 mg. catalyst samples) employing a nitrogen carrier gas into which hydrocarbon samples of ca. 2 mg. were injected. The reaction products were analysed by gas chromatography.

EXAMPLE 3

Experiments were carried out as above using pure n-hexane at a pressure of circa 20 p.s.i.g. The results set out below in Table 2 illustrate the effect of various alkali metals in platinum-on-alumina catalysts, the catalysts being prepared in a manner similar to that described in Example 1.

*Table 2*

| Alkali metal | Max. yield of benzene | Max. yield of hexane isomers |
| --- | --- | --- |
| Nil | 21% wt. at 440° C | 15% wt. at 410° C. |
| Sodium | 57% wt. at 500° C | 5% wt. at 450° C. |
| Potassium | 40% wt. at 500° C | 3% wt. at 470° C. |
| Lithium | 31% wt. at 490° C | 5% wt. at 440° C. |

The following results show the effect of sodium in a platinum-on-alumina catalyst containing fluorine.

*Table 3*

| Catalyst | Max. yield of benzene | Max. yield of hexane isomers |
| --- | --- | --- |
| Without sodium addition | 18% wt. at 430° C | 25% wt. at 360° C. |
| With sodium addition | 53% wt. at 510° C | 2% wt. at 420° C. |
| With sodium addition to a catalyst containing no F. | 57% wt. at 500° C | 5% wt. at 450° C. |

EXAMPLE 4

Using the micro-catalytic reactor technique described above and a sodium-promoted platinum alumina catalyst prepared as described in Example 1, a series of runs were carried out to determine the relative suitability of different paraffin feedstocks. The pressure used in all cases was 20 p.s.i.g.

The feedstocks used, the maximum yield of benzene, and the temperature at which the maximum yield was obtained are set out in Table 4 below.

*Table 4*

| Feedstock | Max. yield of benzene |
| --- | --- |
| n-hexane | 57% wt. at 500° C. |
| 2-methyl pentane | 28% wt. at 575° C. |
| 3-methyl pentane | 52% wt. at 570° C. |
| 2:3-dimethyl butane | 23% wt. at 575° C. |
| 2:2-dimethyl butane | 12% wt. at 590° C. |
| cyclohexane | >90% wt. at 340° C. |
| methyl cyclopentane | 39% wt. at 575° C. |
| 2:5 dimethyl hexane | at least 40% wt. at 470° C. of $C_8$ aromatics. |

These results indicate that:

(1) Normal-paraffins give better yields than iso-paraffins.

(2) Cyclo-paraffins with 6 carbon atoms in the ring give better yields than those with only 5 carbon atoms in the ring.

(3) $C_8$ iso-paraffins having 6 carbon atoms in a straight chain can be cyclised to $C_8$ aromatics.

EXAMPLE 5

Further experiments were carried out again using the micro-catalytic reactor technique described above. The feedstock used was a primary flash distillate having the following composition:

|  | Percent wt. |
| --- | --- |
| Pentanes | 17 |
| Isohexanes | 16 |
| n-Hexane | 20 |
| Isoheptanes | 21 |
| n-Heptane | 19 |
| Cyclohexane | 4 |
| Benzene | 1 |
| Toluene | 2 |

The catalyst used was a sodium promoted platinum-alumina catalyst prepared as described in Example 1, at a pressure of 20 p.s.i.g. The maximum yields of aromatics, which were produced at 575° C. were:

|  | Percent wt. |
| --- | --- |
| Benzene | 29 |
| Toluene | 15 |

We claim:

1. A process for the treatment of a feed stock in which at least the major portion thereof consists of non-aromatic hydrocarbons having at least six carbon atoms in the molecule to form aromatics with substantially no deleterious side reactions occurring, comprising contacting the feedstock in a reaction zone in the presence of a catalyst consisting essentially of from 0.01 to 5% by weight of platinum, 0.01 to 5% by weight of an alkali metal in combined form, and the balance alumina, at a temperature of from 400–600° C., and at a pressure of 0–200 p.s.i. ga., and recovering aromatics therefrom.

2. A process as claimed in claim 1 wherein the catalyst is halogen free and the amount of alkali metal lies within the range 0.01–3% wt.

3. A process as claimed in claim 1 wherein the alkali metal is sodium.

References Cited in the file of this patent

UNITED STATES PATENTS

| 2,386,957 | Ipatieff et al. | Oct. 16, 1945 |
| 2,651,598 | Ciapetta | Sept. 8, 1953 |
| 2,773,011 | Haensel | Dec. 4, 1956 |